Patented May 9, 1939

2,158,035

UNITED STATES PATENT OFFICE 2,158,035

HIGH TEMPERATURE REFRACTORY

John D. Morgan, South Orange, N. J., and Russell E. Lowe, New York, N. Y., assignors to Power Patents Company, Hillside, N. J., a corporation of Maine No Drawing. Application June 27, 1936, Serial No. 87,662

5 Claims. (Cl. 106—9)

The present invention relates to refractories, and more particularly to an improved zircon-silicon refractory and process of making the same.

Refractories made of zircon and silicon bonded together with phosphoric acid are disclosed in the United States patent of John D. Morgan, W. G. Bjordstedt and R. E. Lowe No. 1,811,242. The hereafter described invention is an improvement on such type of refractories.

The primary object of the present invention is to provide a high temperature resistant refractory which shall have high electrical resistance, high thermal conductivity, and a small coefficient of thermal expansion or contraction in use.

With the above and other objects and features in view, the invention is hereinafter described and particularly defined by the accompanying claims.

The composition of the preferred refractory forming the subject of the present invention is as follows:

| | |
|---|---|
| 75% ferro-silicon (through 80 mesh and on 300 mesh screen)_____parts\_\_ | 60 |
| Milled grain zircon (through 300 mesh)_____do\_\_\_\_ | 40 |
| Aluminum hydrate (through 100 mesh)_____do\_\_\_\_ | 1 |
| 85% ortho-phosphoric acid per 100 grams of the above mixture_____c.c\_\_ | 6 |

According to the preferred method of making the refractory there is obtained a dense high temperature resistant refractory material having a high electrical resistance and a thermal conductivity more than one half that of cast iron, which is particularly adapted for use as an electrical resistance heating element. An example of this preferred method of making the refractory is as follows:

Native zircon (zirconium silicate) is milled so that most of the milled material will pass through a 300 mesh screen. Ferro-silicon (preferably 75%–85% silicon) is ground to pass through an 80 mesh screen. Aluminum hydrate is ground to pass through a 100 mesh screen. 40 grams of the milled grain zircon is wetted with water to a creamy consistency and 6 c.c. of 85% ortho-phosphoric acid is added to the wetted zircon. This mixture is digested for a period of about twelve hours at a temperature of 175° F.–200° F. The digested zircon-phosphoric acid mixture is then well stirred and further diluted with water to what might be termed a milky consistency. One gram of the dry aluminum hydrate is mixed with 60 grams of the milled ferro-silicon and the dry-mixed ferro-silicon and aluminum hydrate is added to the milky partially digested zircon-phosphoric acid mixture. The resulting mixture is thoroughly agitated for a brief period and is then allowed to digest for about twelve hours at a temperature of 175° F. to 200° F. The latter period of digestion may be continued until such time as the digested mixture has assumed a solid condition. Preferably, however, the final drying operation is conducted under a strong vacuum (20″ or more) and thoroughly evacuated until all signs of gas ebullition from the mixture have ceased. This solid mixture is then ground and milled to pass through an 80 mesh screen and may be sprayed with water to rehydrate the mixture to a molding consistency; that is, dampened so that it will retain a shape when hand molded. In order to prepare a quick drying refractory suitable for use in spraying surfaces or for molding and casting, it has been found that the final step of rehydration can be advantageously effected by employing as the wetting agent methyl or ethyl alcohol rather than water. Mehyl and ethyl alcohols are suitable quick drying agents which do not react with phosphoric acid and can therefore be used in rehydrating the finely divided refractory to a liquid consistency when a quick drying refractory is required.

A refractory as prepared above may be cast, rammed or molded into various shapes, and is particularly adapted for use in the manufacture of electrical resistance heating elements by embedding a Ni-chrome filament or other resistance wire into a molded refractory shape and hardening. This hardening may be effected by heat treating at temperatures as low as 600° F.

It is to be understood that the invention is not limited to the exact proportions of ingredients stated, but that the proportions given are particularly suitable for use in manufacturing refractory adapted for use in the manufacture of high temperature electrical resistance heating elements, and in general variations of over plus or minus 5% in the composition of the refractory should not be made.

The invention having been thus described, what is claimed as new is:

1. The method of making a refractory composition suitable for shaping and heat hardening comprising mixing about 40 parts by weight of milled grain zircon with water to a fluid consistency, adding about 60 parts by weight of ground ferrosilicon, digesting the mixture while in a fluid consistency state for a long period of time at an elevated temperature with about 6 parts by weight of phosphoric acid, then drying and heat-hardening the digested mixture.

2. The method of making a refractory composition as defined in claim 1 in which the digestion of the mixture is carried out for at least ten hours at a temperature of 200° F. or above before drying and heat-hardening the mixture.

3. The method of making a refractory composition suitable for shaping and heat hardening which comprises mixing to a fluid consistency about 40 to 50 parts by weight of milled grain zircon with water and 60 to 50 parts by weight of ground ferrosilicon and one part by weight of aluminum hydrate digesting the mixture while in a fluid consistency state at an elevated temperature for at least ten hours with six parts by weight of phosphoric acid then drying and heat-hardening the mixture.

4. The method of making a refractory composition suitable for shaping and heat hardening which comprises mixing to a fluid consistency about 40–50 parts by weight of milled grain zircon with water and 50–60 parts by weight of ground ferro-silicon, digesting the fluid mixture for several hours at 175°–200° F. with about 6 parts by weight of phosphoric acid, drying the digested mixture, pulverizing the dry product, and rehydrating the pulverized product.

5. The method of making a refractory composition suitable for shaping and heat hardening which comprises mixing about 40 parts by weight of milled grain zircon with water to a creamy consistency and adding about 6 parts by weight of phosphoric acid, digesting the mixture while in a creamy consistency state for about twelve hours at 17° F.–200° F., further diluting the mixture with water and adding thereto a dry mixture of about 60 parts by weight of ferro-silicon and one part by weight of aluminum hydrate, thoroughly agitating the mixture and digesting for several hours at a temperature of 175° F.–200° F., drying the mixture to a solid consistency, pulverizing to at least 80 mesh, and rehydrating the mixture preparatory to shaping and heat-hardening.

JOHN D. MORGAN.
RUSSELL E. LOWE.

CERTIFICATE OF CORRECTION.

Patent No. 2,158,035.                              May 9, 1939.

JOHN D. MORGAN, ET AL.

It is hereby certified that error appears in the printed specification of the above numbered patent requiring correction as follows: Page 2, second column, line 12, claim 5, for "17° F.-200° F." read 175° F.-200° F.; and that the said Letters Patent should be read with this correction therein that the same may conform to the record of the case in the Patent Office.

Signed and sealed this 17th day of October, A. D. 1939.

(Seal)

Henry Van Arsdale,
Acting Commissioner of Patents.